July 14, 1925.
A. PONDELICK
PISTON CONSTRUCTION
Filed May 31, 1923
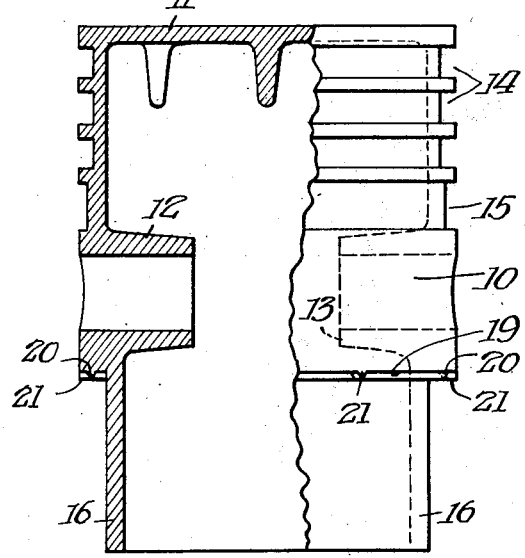
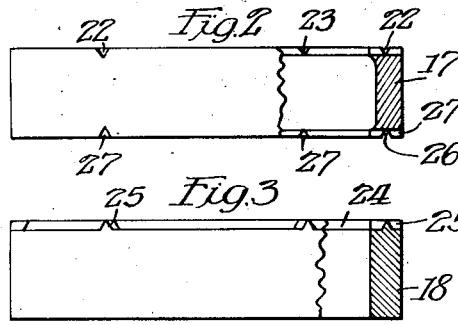
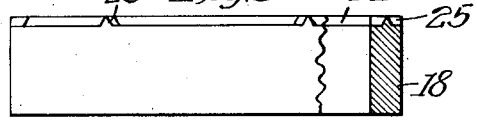
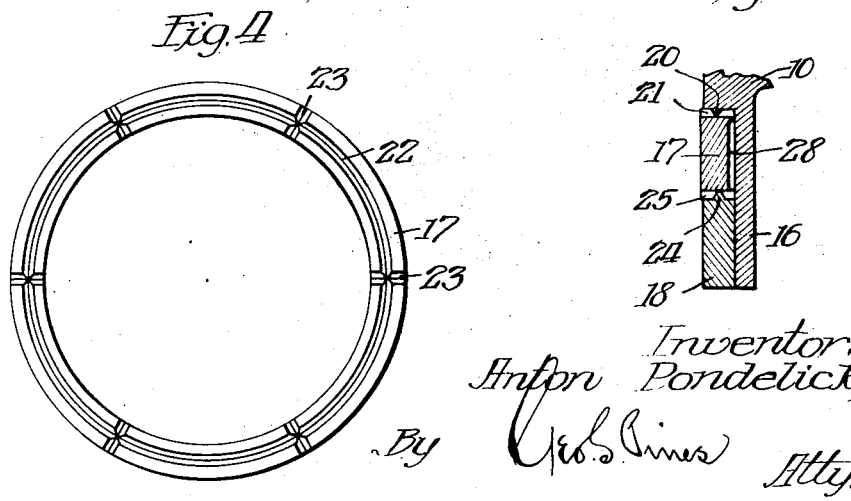
Inventor:
Anton Pondelick,
By Geo. S. Sines
Atty.

Patented July 14, 1925.

1,545,973

UNITED STATES PATENT OFFICE.

ANTON PONDELICK, OF CHICAGO, ILLINOIS.

PISTON CONSTRUCTION.

Application filed May 31, 1923. Serial No. 642,443.

*To all whom it may concern:*

Be it known that I, ANTON PONDELICK, a citizen of the United States, and a resident of Chicago, in the county of Cook and State of Illinois, have invented certain new and useful Improvements in Piston Construction, of which the following is a specification.

My invention relates to new and useful improvements in pistons of the type in which a body of lighter material such as aluminum or aluminum alloy is surrounded by reenforcing or bearing rings of heavier material such as cast iron.

One of the important objects of the invention is to provide improved construction and procedure for applying the bearing ring to the piston body and securing it in such manner that it will be unable to move laterally, vertically or rotationally on the piston body when the piston structure is rapidly reciprocated in the engine.

Another important object is to release the metal of the body from expansion and contraction strain at the bearing rings and so that the metal of the body may expand at the bearing rings without causing excessive or distortional pressure against the rings.

The above and other features of my invention are clearly shown on the structure disclosed on the accompanying drawing, on which Fig. 1 is a side elevational view partly in vertical diametral section of the piston structure before the bearing ring has been applied and secured thereto, Fig. 2 is a side elevational view of a bearing ring partly in section, Fig. 3 is a side elevational view partly in section of the aluminum ring which is fused to the lower end of the piston body to secure the bearing ring in place.

Fig. 4 is a plan view of the piston ring, and

Fig. 5 is an enlarged sectional view showing the interconnection between the ring and the piston body.

The body of the piston comprises the cylindrical wall 10 and the head 11, the lugs 12 and 13 extending radially inwardly to journal the wrist pin (not shown) with which connects the connecting rod.

The body is of aluminum alloy or some other light weight metal and is cast in a die. At the upper end of the structure are a number of circumferential channels 14 for receiving the ordinary compression rings. Below these channels is a larger channel 15 for receiving a non-tension band preferably in the form of a split ring of iron which can be placed in position after the piston body has been made.

The piston end 16 is of uniform but reduced diameter for receiving the bearing ring 17 and the locking ring 18. The ring 17 is preferably of heavier material such as cast iron and of a diameter to enable it to be forced along the end 16 into engagement with the shoulder 19. After this ring has been moved into position the ring 18 which is of aluminum is slipped on to the end 16 against the ring 17 and is then fused or welded securely into position to thus hold the wearing ring in place. To securely lock the ring 17 against any lateral, radial or rotational movement on the piston body, I provide tongue and groove interlocking connections between the ring and the piston body and ring 18. As shown the shoulder 19 has the annular tongue 20 and the transverse tongues 21 extending therefrom for engaging respectively in the annular groove 22 and cross grooves 23 in the top of the bearing ring 17. The ring 18 on its upper end has the annular tongue 24 and the cross tongues 25 for engaging respectively in the annular groove 26 and cross grooves 27 in the lower end of the bearing ring. The tongues are preferably formed on the piston body and ring 18 during the casting operation as such casting is performed in dies. The grooves are preferably machined in the bearing ring as this is in the form of a rough casting machined to size. After the rings 17 and 18 are forced on to the end 16 and the ring 18 is securely fused or welded in place the inter-engaging tongues and grooves will rigidly secure the bearing ring against any movement relative to the piston body so that it cannot work loose or wear unevenly during operation of the engine, or cause noise. After the rings are in place the piston structure can be finished to produce an accurate cylindrical surface, the outer diameter of the bearing ring being sufficiently larger so that this ring together with the compression rings will bear against the cylinder walls and prevent wearing of the aluminum piston body.

In order to relieve the bearing ring as much as possible from the expansion strain of the aluminum body I provide clearance space 28 between the ring and body. This space can be provided in the piston body or as shown the ring may be cut away a sufficient distance inwardly of its edges to produce the required clearance space. The piston body can therefore readily expand adjacent the bearing ring without expanding the bearing ring and increasing its frictional engagement with the cylinder wall.

I do not desire to be limited to the exact construction and arrangement shown and described as changes may be made which will still come within the scope of the invention.

I claim as follows:

1. In a piston, the combination of the cylindrical body of light material, said body at one end being of reduced diameter to leave an abutment shoulder, a bearing ring fitted to receive said reduced end and to abut against said shoulder, and a retaining ring receiving said reduced end to abut against said bearing ring, said retaining ring being of the same metal as said piston body and being fused to the piston body to thereby lock the bearing ring in place.

2. In a piston, the combination of the cylindrical body, said body being of reduced diameter at one end to leave an abutment shoulder above said end, a bearing ring receiving said reduced end and engaging against said abutment shoulder, a retaining ring slipped on to said reduced end after application of the bearing ring thereto, said retaining ring being secured to the piston body, and tongue and groove connection between said bearing ring and said abutment shoulder and retaining ring whereby said bearing ring will be locked against movement on said body.

3. In a piston, the combination of the cylindrical body having an end section of reduced diameter, an abutment shoulder at the upper end of said reduced section, a bearing ring slipped over said reduced section to abut against said shoulder, a retaining ring slipped over said reduced section against said bearing ring, longitudinal and transverse grooves in the ends of said bearing ring, and longitudinal and transverse tongues on said shoulder and retaining ring for engaging in said grooves of the bearing ring, said retaining ring being rigidly secured to said body whereby said bearing ring will be securely anchored against any movement relative to said body.

4. In a piston, the combination of a cylindrical body of light metal, said body having an end of reduced diameter and an abutment shoulder, a bearing ring of heavier metal receiving said reduced end and engaging against said shoulder, a retaining ring of the same metal as said body receiving said end and abutting against said bearing ring and being fused to said body, and transverse and longitudinal tongue and groove connections between said bearing ring and said shoulder and retaining ring whereby said bearing ring will be rigidly locked against lateral, longitudinal and turning movement.

In witness whereof, I hereunto subscribe my name this 28th day of May, A. D. 1923.

ANTON PONDELICK.